United States Patent [19]

Ferrin et al.

[11] 4,417,971

[45] Nov. 29, 1983

[54] CIRCUIT FOR MAINTAINING THE STRENGTH OF AN ELECTROSTATIC FIELD GENERATED IN A FLUID MIXTURE OF VARYING DIELECTRIC STRENGTH

[75] Inventors: Charles R. Ferrin, Sand Springs; Floyd L. Prestridge, Mounds, both of Okla.

[73] Assignee: Combustion Engineering, Inc., Windsor, Conn.

[21] Appl. No.: 325,799

[22] Filed: Nov. 30, 1981

[51] Int. Cl.³ ............................................. B01D 17/06
[52] U.S. Cl. .................................... 204/305; 204/191
[58] Field of Search ............................ 204/302–308, 204/186–191

[56] References Cited

U.S. PATENT DOCUMENTS

| | | | |
|---|---|---|---|
| 1,934,923 | 11/1933 | Heinrich | 204/191 X |
| 2,000,018 | 5/1935 | Heinrich | 204/24 |
| 2,029,362 | 2/1936 | Dillon | 204/24 |
| 2,894,895 | 7/1959 | Turner | 204/302 |
| 3,519,550 | 7/1970 | Winslow, Jr. et al. | 204/305 |
| 3,772,180 | 11/1973 | Prestridge | 204/305 |

Primary Examiner—G. L. Kaplan
Assistant Examiner—William Leader
Attorney, Agent, or Firm—Arthur L. Wade

[57] ABSTRACT

The electrodes between which AC and DC electrostatic fields are sustained in a liquid mixture are connected to ground potential through rectifiers arranged to maintain the strength of the DC electrostatic field as the dielectric strength of the liquid mixture decreases.

4 Claims, 4 Drawing Figures

CIRCUIT FOR MAINTAINING THE STRENGTH OF AN ELECTROSTATIC FIELD GENERATED IN A FLUID MIXTURE OF VARYING DIELECTRIC STRENGTH

TECHNICAL FIELD

The present invention relates to the simultaneous generation of a DC electrostatic field and an AC type of electrostatic field through which a two-phase mixture of immiscible polar and non-polar liquids is sequentially passed and the dispersed droplets of polar liquid are coalesced into sizes large enough for their effective gravitation from the mixture. More particularly, the invention relates to providing a circuit for electrodes which are energized to generate a DC electrostatic field and an AC type of electrostatic field, which circuits are controlled by rectifiers to limit the DC potential between the electrodes as the dielectric strength of the liquids between the electrodes decreases.

BACKGROUND ART

First, the disclosures of U.S. Pat. Nos. 3,772,180 and 3,847,775 are incorporated in this present disclosure by reference. The two incorporated disclosures are duplicates of each other, their claims separately covering the method and apparatus of their inventions. The general organization of the disclosures of these two patents is followed in the present disclosure. A mixture of oil and water represents the medium passed sequentially through the DC and AC type of electrostatic fields generated by the electrodes. The mixture may be more generally defined as that of a polar liquid finely dispersed and in an immiscible non-polar liquid. Of course, interchangeably, the disclosure can refer to either a two-phase mixture of immiscible polar and non-polar liquids, or a mixture of oil and water. In both events, the problem arises with the reduction in the dielectric strength of these mixtures. The effectively AC electrostatic field is generated between the electrodes and the ground reference, while the second electrostatic field is maintained between the electrodes. The mixture of liquids is first flowed through the AC type of field and, secondly, through the DC field for progressive coalescence of the dispersed liquid droplets.

Subsequent to the formation of the disclosures of the incorporated patents, emulsions have been discovered as having variable dielectric strengths. This mode of expression contrasts with the previous reference to varying electrical conductivity of the emulsions. It now appears more appropriate to use the term dielectric strength as compatible with the characteristics of the electrostatic fields.

There has been a nagging problem in reducing the invention of the incorporated patents to practice. Specifically, when flowing emulsions of decreasing dielectric strength through the two electrostatic fields, the DC electrostatic field between the energized electrodes correspondingly decreases to ineffective values. Various arrangements to maintain the strength of the DC field have been employed, but no arrangement has satisfactorily obviated the simultaneous loss of AC field strength. Fortunately, there is prior art which exemplifies the inadequate solution to this problem.

U.S. Pat. No. 4,049,535 discloses one arrangement to maintain the DC field while the load impedance of the emulsion is low. However, the addition of the full-wave rectifier, utilizing a grounded center-tap transformer, eliminates the AC field. The opposing voltages generated cancel each other, resulting in zero voltage between the combined electrodes and ground. This arrangement destroys the valuable AC field required in the sequential application of the two electrostatic fields. A circuit arrangement is needed which will sustain a DC field of significant strength without significantly reducing the strength of the AC field.

DISCLOSURE OF THE INVENTION

The present invention contemplates connecting at least one rectifier in the dual polarity circuit to maintain a predetermined minimum DC voltage between energized electrodes when the impedance of the medium between the electrodes decreases while also maintaining an AC field between the electrodes and the ground reference. This arrangement will also allow the reestablishment of normal DC operating potentials when the impedance of the medium between the electrodes increases to its original value.

Other objects, advantages and features of this invention will become apparent to one skilled in the art upon consideration of the written specification, appended claims, and attached drawings.

BRIEF DESIGNATION OF THE DRAWINGS

FIG. 1b is a schematic representation of applied voltages in the circuit of FIG. 1a and the voltages appearing between electrodes of FIG. 1a;

FIG. 2b is a representation of voltages in the circuit of FIG. 2a.

BEST MODE FOR CARRYING OUT THE INVENTION

NOMENCLATURE

The disclosure carefully characterizes the medium in which electrostatic fields are sustained between charged electrodes. Note that the broadest description refers to a mixture of two liquids which are immiscible relative to each other, one liquid being more polar than the other. The mixture is referred to as an emulsion. In the oil field, an emulsion of oil and water is common. Oil and water fall into the category of two liquids which are immiscible relative to each other, the water being the more polar and dispersed in the form of droplets within the less polar oil.

The rectifier has been a unit of electric circuits for many years. Recently, the term diode has been applied to devices which function as the rectifier functions. Further, it has become the practice to refer to a diode stack as the unit which is essentially a plurality of rectifiers in series. Those skilled in the art should not be confused between the terms rectifier, diode, and diode stacks, as they are all electrically equivalent and can be designated with a common symbol.

THE PROBLEM

Figure 1A:
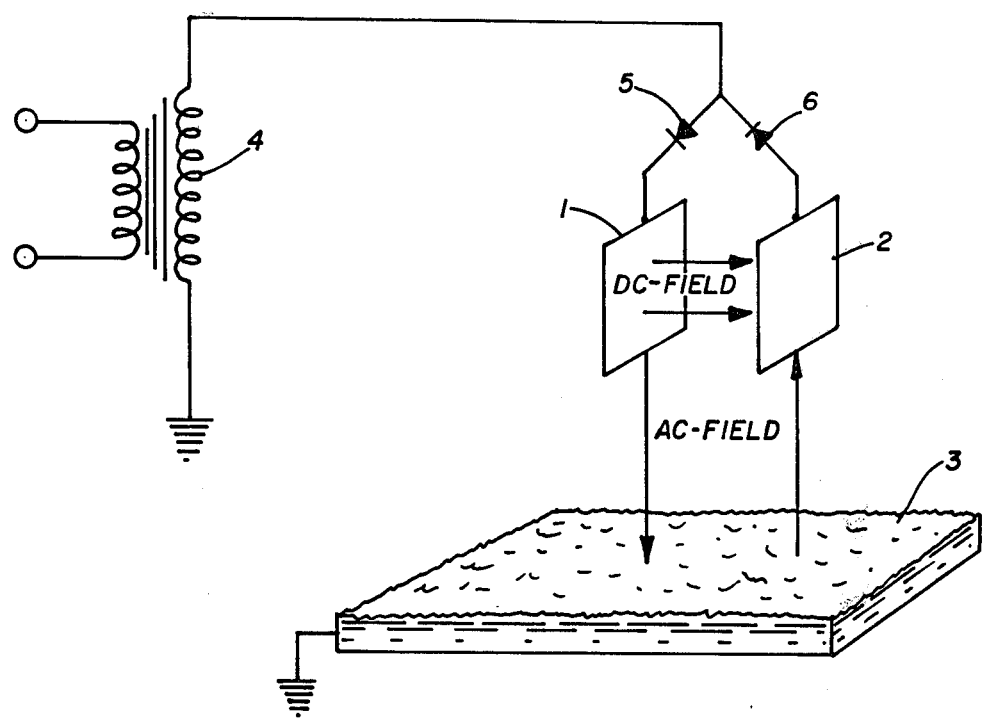
FIG. 1a is a schematic of a circuit for an electrostatic field generator representing the problem met by the present invention.
Figure 1B:
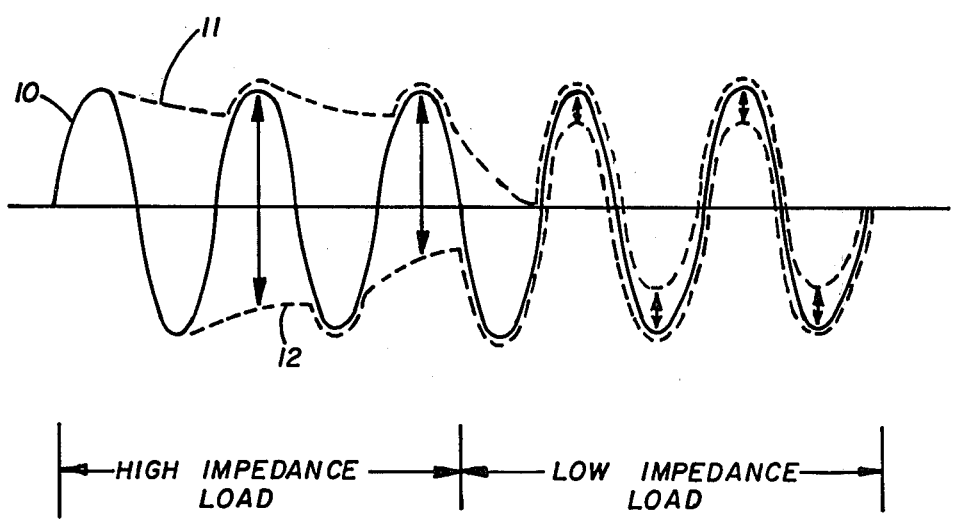

The disclosures of the incorporated patents have been successfully reduced to practice for years as the so-called dual polarity circuit. The dual polarity circuit has functioned successfully to coalesce droplets of water dispersed in oil. However, a problem has slowly crystallized in the applications of the dual polarity circuit where the oil treated is relatively heavy and its emulsion has a relatively high proportion of water. Thus far, the problem has appeared in relatively infrequent instances, but its appearance has generated the present invention. FIGS. 1a and 1b are offered to disclose and emphasize the emerging problem experienced with the actual reduction to practice of the circuit of the incorporated patent disclosures. Electrodes 1 and 2 are spaced from each other and immersed in the liquid mixture. A third electrode 3 is constructively formed as the upper surface of the body of relatively polar conductive liquid below the electrodes 1 and 2 which has been coalesced from the mixture. Energized by transformer 4, the arrangement of the electrodes 1, 2 and 3 are familiar from the disclosures of the incorporated patents.

The AC form of electrostatic field generated between the lower ends of electrodes 1 and 2 and surface electrode 3 is a feature familiar from the incorporated disclosures. At the same time, the DC electrostatic field is generated between electrodes 1 and 2. The liquid mixture flows sequentially through the AC type of field and the DC field so that the two electrostatic fields may effectively coalesce the droplets of polar liquid to a size which will enable them to gravitate into and join the lower body of liquid having surface 3.

The electrodes 1 and 2 are connected in parallel to transformer 4, the separate connections containing oppositely poled rectifiers 5 and 6, as symbolized in FIG. 1a. The AC voltage applied from transformer 4 develops the two electrostatic fields with strengths depending upon the dielectric strength of the mixture. The problem met by this disclosure develops when this dielectric strength, and consequent impedance of the mixture, decreases to a value which yields the results charted in FIG. 1b. FIG. 1b is, essentially, a chart of the voltage variations in the circuit of FIG. 1a. The AC voltage of the transformer 4 is represented by sinusoidal curve 10. The first two complete cycles shown of this applied voltage of curve 10 generate the voltage on electrode 1, as represented by curve 11. Curve 12 represents the voltage appearing on electrode 2. The difference between curves 11 and 12, therefore, represents the voltage between electrodes 1 and 2 with their DC electrostatic field generated between them. Specifically, the vertical distance between curves 11 and 12, during the first two cycles of the applied voltage of curve 10, represent the value of this DC voltage when the dielectric strength of the liquid mixture between the electrodes is relatively high. This explanation is, more or less, a review of the disclosures of the incorporated patents to dramatically illustrate the appearance of the nagging problem brought about by a significant decrease of the dielectric strength of the fluid medium between electrodes 1 and 2.

It is to be noted that the first two cycles of the voltage curves in FIG. 1b may be described as normal operation. The curves have been extended to form the subsequent two cycles in illustration of the problem to be solved. Of course, the transition does not take place as abruptly as illustrated by the lack of transition between the first two cycles and the last two cycles. The common sense of one skilled in the art permits the juxtaposition of the two pairs of cycles to illustrate the problem solved by the invention.

The last two cycles of the applied voltage of curve 10 are displayed with the extensions of curves 11 and 12 to demonstrate the decrease of the DC potential between electrodes 1 and 2. Essentially, during the last two cycles of applied voltage, when the dielectric strength between electrodes 1 and 2 deteriorates to a relatively low value, the voltage on the undriven electrode of 1 and 2 closely follows the voltage on the driven electrode. With the driven and undriven electrode voltages closely following each other during the last two cycles of the voltage applied to them, the DC voltage appearing between the two electrodes is represented by the small, vertical distance between the two electrode voltages. The result is that the DC electrostatic field deteriorates to such a low value that it becomes ineffective to coalesce the polar liquid dispersed in the non-polar liquid. The voltage of the positively charged electrode actually passes through zero voltage and is negatively charged for a portion of each applied voltage cycle. Similarly, the voltage of the negatively charged electrode actually passes through zero voltage and is positively charged for a portion of each voltage cycle. It is an object of the present invention to supply a circuit in the network disclosed in FIG. 1a which will limit the voltage of an undriven electrode of 1 and 2 so that it will not follow the voltage of the driven electrode beyond zero, or ground potential. This novel circuit insures that there will always be at least transformer voltage between the electrodes, within the power output limits of the transformer, during the period of low impedance between the electrodes. In the preferred embodiment, the circuit addition incorporated will not allow either electrodes 1 or 2 to reverse polarity. The voltage on the undriven electrode is clamped to zero, or ground potential, if the voltage attempts to reverse its polarity.

EMBODIMENT OF THE INVENTION

Figure 2A:
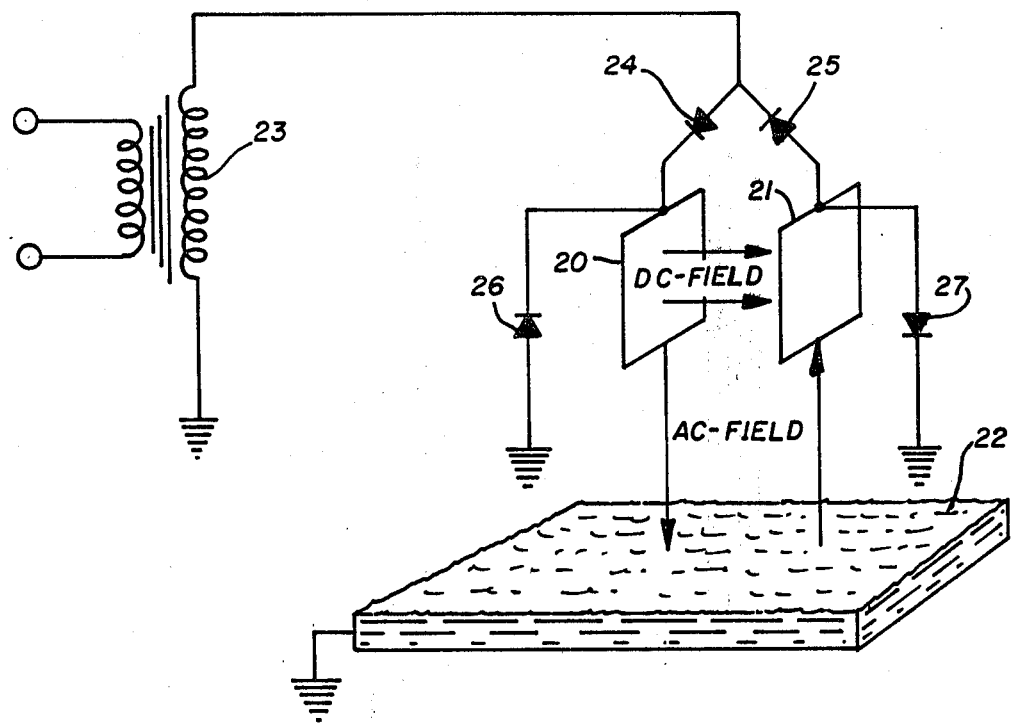
FIG. 2a is a schematic of the circuit of FIG. 1a embodying the present invention.

FIG. 2a discloses a circuit generally similar to that of FIG. 1a. Electrodes 20 and 21 are spaced from each other in the stream of liquid mixture processed by the electrostatic fields between electrodes 20, 21 and surface electrode 22. Electrodes 20 and 21 are connected in parallel to transformer 23 through oppositely poled rectifiers 24 and 25.

Figure 2B:
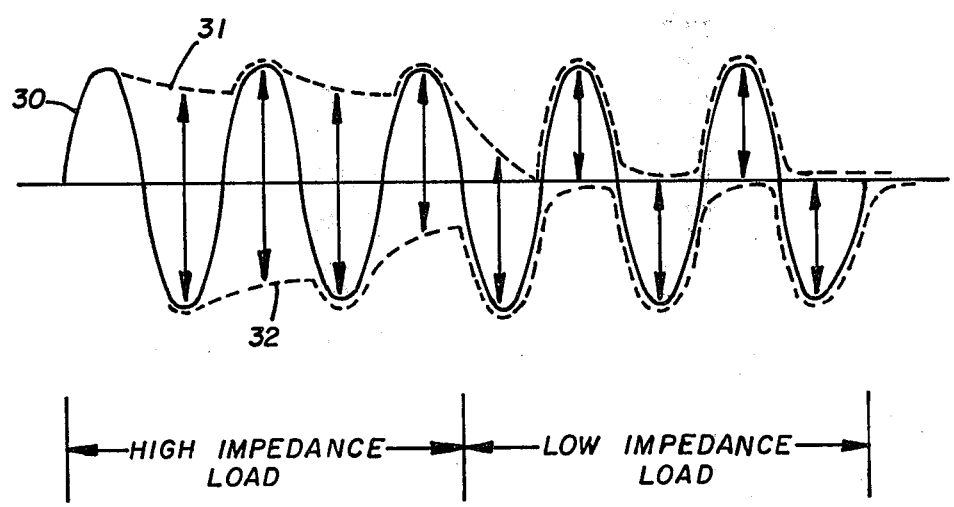

FIG. 2b is generally similar to FIG. 1b in that it is a chart of the voltage variations of the circuit of FIG. 2a as embodying the invention. The present invention embodies the concept of providing an electrical circuit with low impedance to ground when the voltages on electrodes 20 and 21 attempt to reverse their intended polarity. To preferably embody the invention, rectifier 26 is connected between electrode 20 and ground, and rectifier 27 is connected between electrode 21 and ground potential. Oriented as symbolized in FIG. 2a, these rectifiers function to limit the potential, relative to ground, of each non-driven electrode to zero as a potential of opposite polarity is applied to the driven electrode.

The voltage chart of FIG. 2b shows the first two cycles of applied sinusoidal voltage represented as curve 30, while the electrode voltages are represented as curves 31 and 32. Of course, the first 2 cycles of applied voltage of curve 30 essentially duplicate the voltage patterns of the first two cycles of applied voltage in FIG. 1b. The last two cycles of applied voltage of curve 30 illustrate the voltage limitation of electrodes 20 and 21, as charted by curves 31 and 32. Limited to zero, or ground, potential when the dielectric strength between the electrodes is relatively low, the DC potential between the electrodes is represented by the vertical distance between curves 31 and 32. In comparison of this differential with that of the last two cycles of curves 11 and 12 of FIG. 1b, there is demonstrated the effectiveness of the present invention to maintain the DC potential to a significant value during the periods when the mixture between the electrodes is of relatively low dielectric strength.

CONCLUSION

The beauty and concomitant simplicity of the invention should now be apparent to those skilled in the art. From a functional standpoint, the invention merely prevents the potential difference between electrodes 20 and 21 from collapsing to such a low value that their electrostatic field is ineffective in bringing about coalescence. Structurally, the invention is embodied in the circuit provided by connecting rectifiers 26 and 27 between electrodes 20 and 21 and ground potential. Of course, these rectifiers are poled oppositely of each other and reverse biased when the associated electrode is driven to provide the required function to carry out the invention. FIG. 2a discloses the complete circuit, or electrical network, in which the invention is embodied, and the voltage chart of FIG. 2b dramatically discloses the limitation imposed upon the electrode voltages to maintain the differential required.

It is not to be overlooked, when measuring the breadth of the invention, that there is invention in connecting one of the electrodes to ground through a single rectifier. Thus, with at least one of the electrodes connected to ground potential through a rectifier, as disclosed in the drawings, a significant DC potential will be maintained between the electrodes when the dielectric strength of the mixture between the electrodes is at a low ebb. The breadth of the invention is, thus, defined while the preferred embodiment utilizes a rectifier circuit for each of the two electrodes.

From the foregoing, it will be seen that this invention is one well adapted to attain all of the ends and objects hereinabove set forth, together with other advantages which are obvious and inherent to the apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

We claim:

1. A system for coalescing droplets of a relatively polar liquid which are finely dispersed within a body of an immiscible relatively non-polar liquid, including,
at least two sources of DC voltage pulses,
a pair of electrodes spaced within a mixture of polar and non-polar immiscible liquids,
means for connecting the pair of electrodes and the DC voltage sources such that each of the electrodes has voltage pulses of one of the sources applied to it to generate an electrostatic field in which the polar liquid droplets will coalesce to a size which will cause their gravitation within the non-polar liquid,
means for forming a body of the coalesced and gravitated polar liquid droplets below the pair of electrodes,
and a rectifier connected between one of the electrodes and ground potential to maintain a differential of DC potential between the electrodes as the proportion of polar and non-polar immiscible liquids of the mixture changes to reduce the dielectric strength of their mixture.

2. The system of claim 1, in which,
the sources of DC voltage pulses include a transformer energized by AC voltage and two oppositely poled rectifiers connected to said transformer, and wherein said means for connecting includes a connection between each of said rectifiers and one of said electrodes.

3. A system for coalescing water which is dispersed in the form of droplets throughout a second liquid, including,
at least one pair of electrodes spaced from each other within a mixture of water dispersed in the form of droplets throughout a second liquid,
a body of water spaced below one of the electrodes and connected to ground potential,
a transformer energized by AC voltage for supply of electrical potential to the electrodes,
a first electrical connection between the secondary of the transformer and ground potential,
a second electrical connection between the secondary and one of the pair of electrodes controlled by a first rectifier,
a third electrical connection between the secondary and the other of the pair of electrodes controlled by a second rectifier oppositely poled from the first rectifier,
and two rectifiers with each connected between one of the two electrodes and ground potential with the two rectifiers being poled to maintain a predetermined minimum DC potential between the electrodes as the proportion of water in the mixture increases to reduce the dielectric strength of the mixture.

4. The system of claim 3, in which,
the first electrical connection is between one end of the secondary and ground potential and the second and third electrical connections are between the other end of the secondary and the electrodes.

* * * * *